United States Patent [19]

Tingskog

[11] 4,234,075
[45] Nov. 18, 1980

[54] APPARATUS FOR SEALING A CONNECTION BETWEEN TWO MUTUALLY SHIFTABLE COMPONENTS

[75] Inventor: Karl A. L. Tingskog, Helsingborg, Sweden

[73] Assignee: AB Siwertell, Bjuv, Sweden

[21] Appl. No.: 33,642

[22] Filed: Apr. 25, 1979

[30] Foreign Application Priority Data

Apr. 27, 1978 [SE] Sweden .............................. 7804841

[51] Int. Cl.³ ...................... B65G 15/22; B65G 21/10
[52] U.S. Cl. ................................... 199/594; 160/122; 198/861; 414/145
[58] Field of Search ............... 148/585, 588, 594, 860, 148/861; 414/145; 160/122, 241; 198/571, 572

[56] References Cited

U.S. PATENT DOCUMENTS 1,204,203  11/1916  Stuart ................................ 198/588
2,811,201  10/1957  Reid .................................. 160/122
3,825,106  7/1974  Wickam et al. ..................... 198/572

*Primary Examiner*—Robert B. Reeves
*Assistant Examiner*—Douglas D. Watts
*Attorney, Agent, or Firm*—Beveridge, DeGrandi, Kline and Lunsford

[57] ABSTRACT

Two components, for example, conveyors, are interconnected by the intermediary of a connecting portion. The component connected to the connecting portion is shiftable along an alongate opening in the other component. The elongate opening is closable by means of a flexible web length which extends in the longitudinal direction of the elongate opening and in a loop about the connecting portion of the movable component. The connecting portion has guide means for successive lifting-out and laying of the web length respectively away from and towards the elongate opening on shifting of the connecting portion therealong.

11 Claims, 10 Drawing Figures

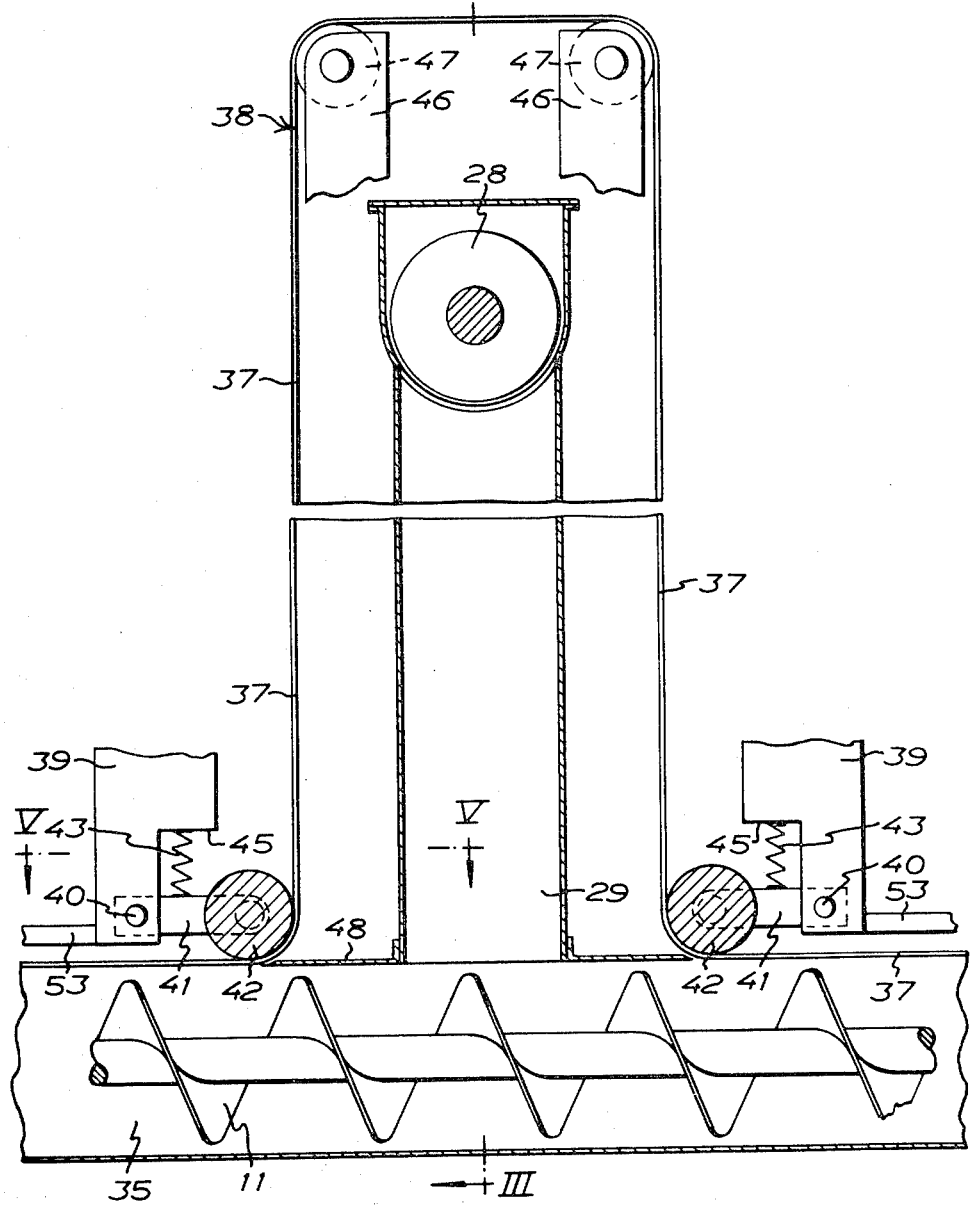

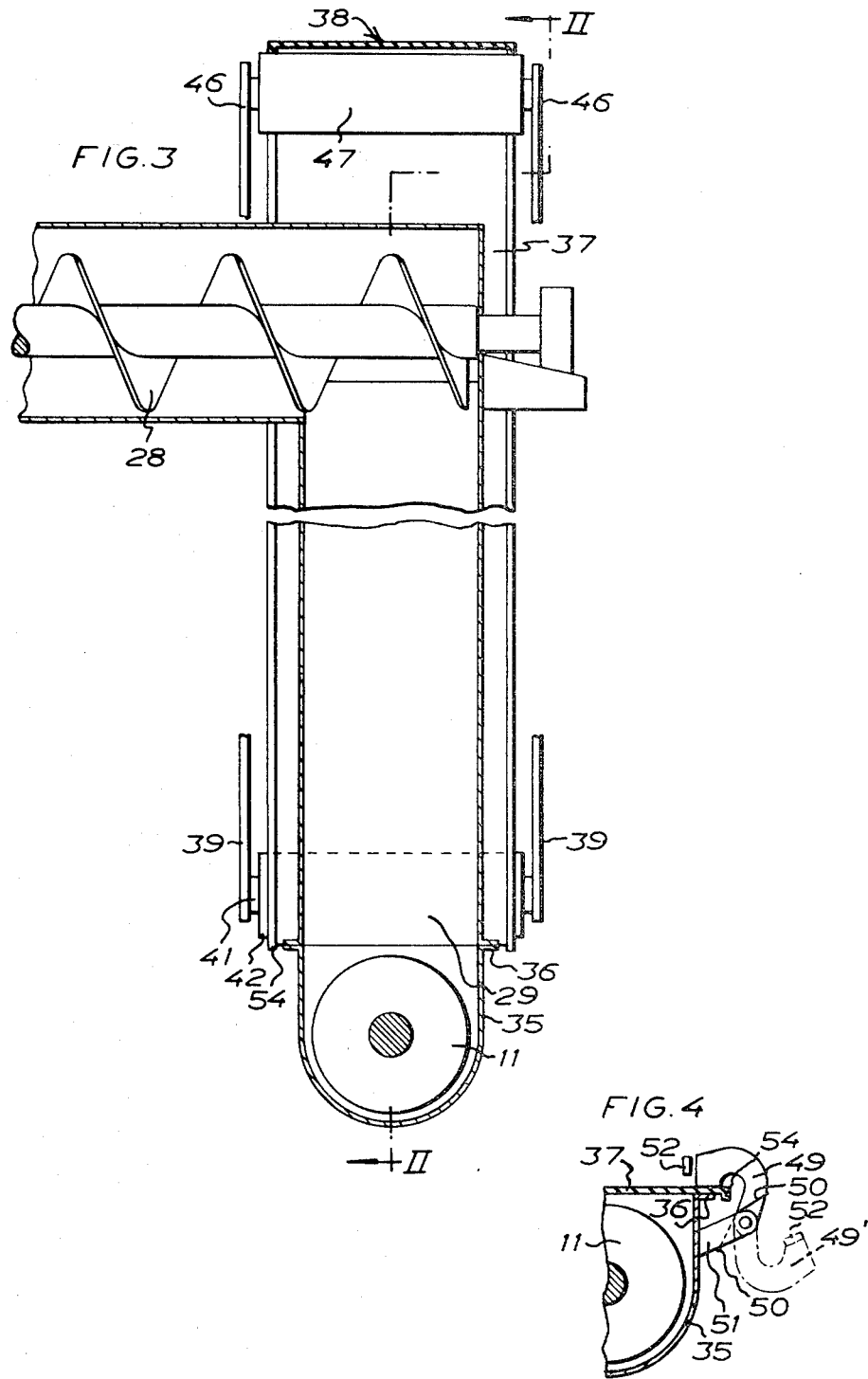

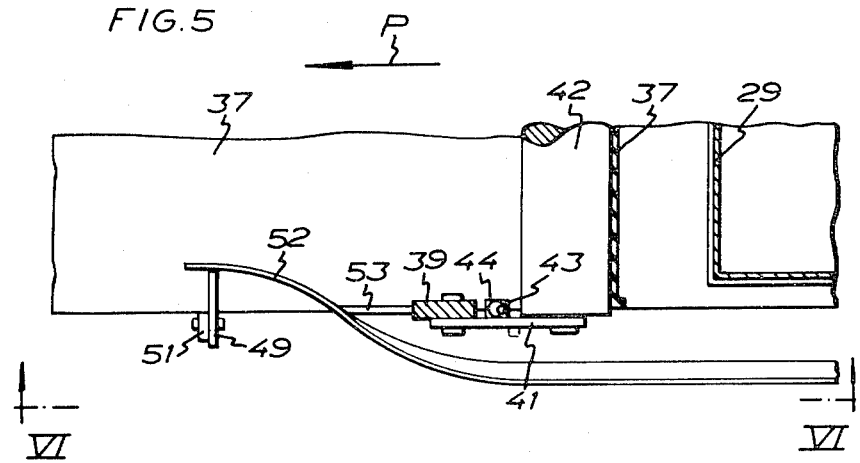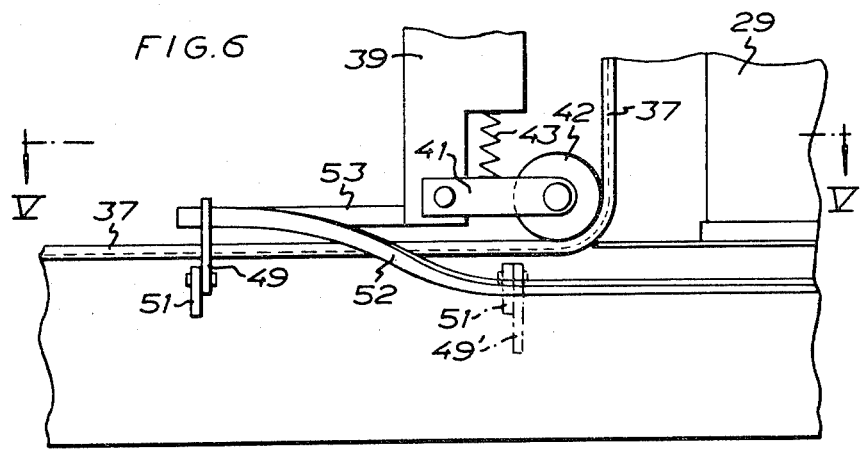

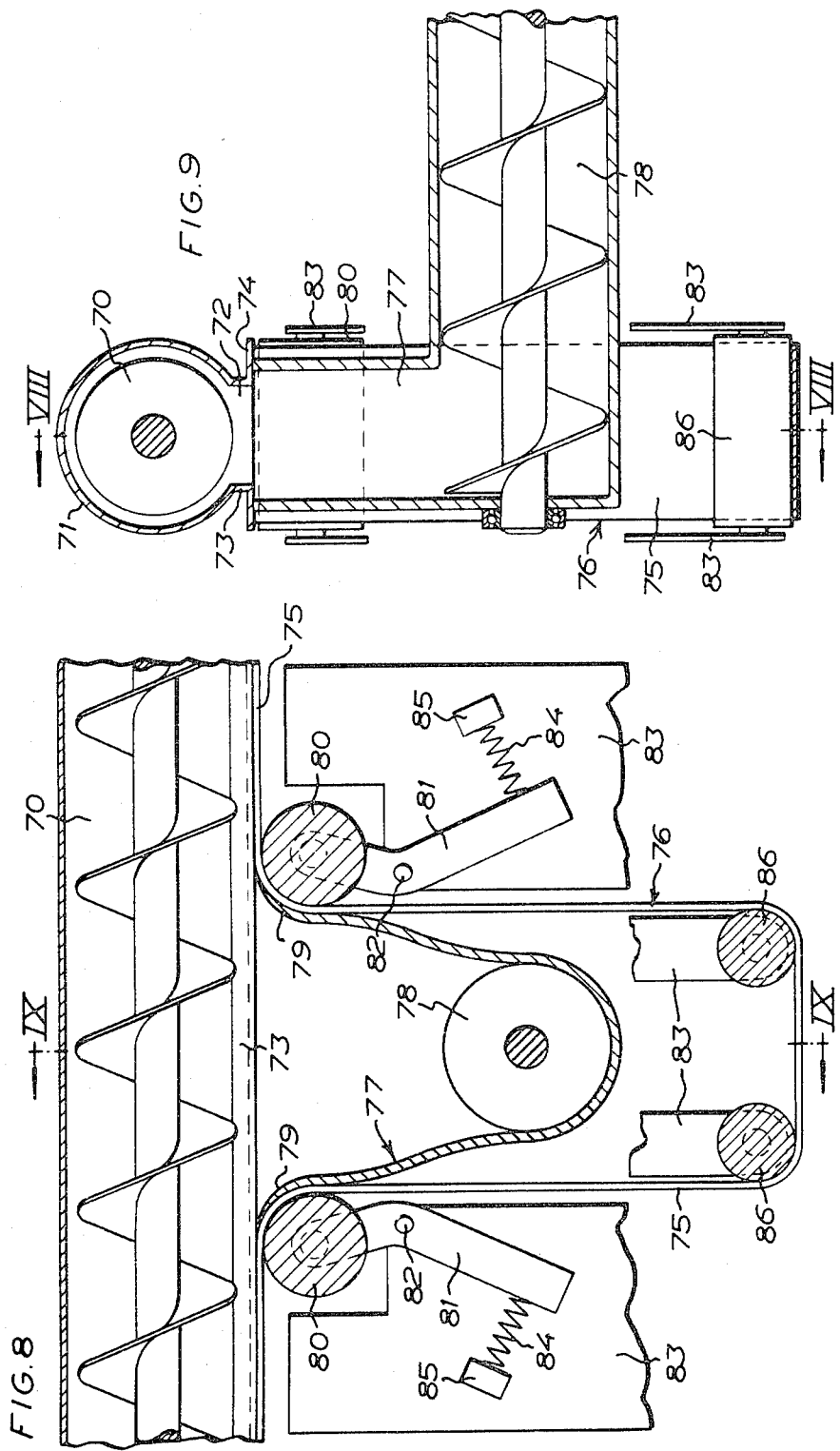

APPARATUS FOR SEALING A CONNECTION BETWEEN TWO MUTUALLY SHIFTABLE COMPONENTS

There are many occasions within the art when two components must be interconnected in such a manner that the one component is shiftable along an elongate opening in the other component, in which event the opening must be sealable by means of a lid device. One such occassion is to be found in conjunction with two conveyors which cross each other and in which it must be possible to shift the one conveyor to optional positions along the other conveyor and to receive bulk goods from or deposit bulk goods on the other conveyor at all of these optional positions. Another such occasion is to be found in power transmission between an elongate worm and a worm wheel if the worm wheel need be shiftable along the worm.

However, the invention will be described in particular connection with conveyors.

In conjunction with the unloading of loose cargo or particulate bulk material, use is often made of screw conveyors which are arranged as a crane arm system on a crane which may run on rails, for example, along a quay. The bulk goods unloaded by means of the unloading apparatus are, in such a case, normally fed from the unloading apparatus to a conveyor belt extending along the quay and conveying the goods to some suitable store. The conveyor belt may be disposed within an elongate housing which has a number of openable hatches through which the outlet conveyor of the unloading apparatus may be projected. However, this type of arrangement is troublesome in operation and is, above all, bulky and expensive. One object of the present invention is, therefore, to produce another type of transfer and sealing device which allows for a shifting of the one conveyor with respect to the other to optional positions without the need of opening and closing different hatches.

Another occasion on which there may be a need for a simple and robust apparatus which allows for the transfer of loose cargo or bulk material between two conveyors is in conjunction with the storage of loose bulk cargo in berthed tankers or standard bulk carriers converted to floating bulk terminals. In such a case, it has been proposed in the art that a conveyor be placed in the longitudinal direction of the deck of the vessel and have outlet openings at each one of the cargo holds which are to be used for storage purposes. This elongate conveyor should then be supplied with material from a suitable unloading apparatus by means of which the bulk cargo may be unloaded from an arriving freighter. In such a case it would be advantageous if also this unloading apparatus could be disposed movable on rails along the deck of the vessel. In order to make possible the transfer of the loose cargo from the unloading apparatus to the elongate distribution conveyor, one conceivable design of the distribution conveyor is with an upwardly directed elongate opening which could be covered by means of a number of separate, swingable lids which are then successively swung up on shifting of the unloading apparatus along the vessel. However, such an arrangement is circumstantial and slow to operate, since the lids must be unlocked and swung out of the way on shifting of the unloading apparatus.

Another object of the present invention is, therefore, to simplify this proposed apparatus.

Thus, the present invention has produced an apparatus for sealing a connection between two components, one of which is shiftable along an elongate opening in the other, the opening being sealable by means of a lid device. The novelty residing in the present invention is that the lid device is formed of a flexible web which extends in the longitudinal direction of the elongate opening and in a loop about a connecting portion of the first component extending transversely of this opening, the connecting portion having guide means for successive lifting out and laying of the web respectively away from and towards the elongate opening, on shifting of the connecting portion therealong.

As a result of this design of the sealing device, the movable component (which may be a conveyor) will move with its connecting portion within a loop formed by the flexible web whose location may be shifted along the elongate opening in the other component which may be a conveyor or the roof of an elongate storage space.

When the invention is utilized for sealing between two bulk material conveyors which cross each other, the elongate opening may be disposed along the upper side of the bulk material removal conveyor, the bulk material supply conveyor having its connecting portion designed as a transition housing which is shiftable along the elongate opening.

However, it is also possible to cause the bulk material supply conveyor to have an elongate opening in its lower region, the bottom of this conveyor being at least partly formed of the web and the bulk material removal conveyor being provided with a connecting portion in the form of a feed-in funnel which is shiftable along the underside of the bulk material supply conveyor and around which extends the loop of the web.

The invention will be described in greater detail hereinbelow with reference to the accompanying drawings, in which:

FIG. 2 is a schematic section through a portion of the conveyors shown in FIG. 1;

FIG. 3 is a section taken along the line III—III in FIG. 2;

FIG. 4 is a cross-section through a corner portion of the one conveyor in FIGS. 2 and 3;

FIG. 5 shows a part of a section along the line V—V in FIG. 2;

FIG. 6 shows parts of a view along the line VI—VI in FIG. 5;

FIG. 8 shows another embodiment of the invention in which a bulk material removal conveyor is shiftable along a stationary bulk material supply conveyor;

FIG. 9 is a section taken along the line IX—IX in FIG. 8; and

Figure 1:
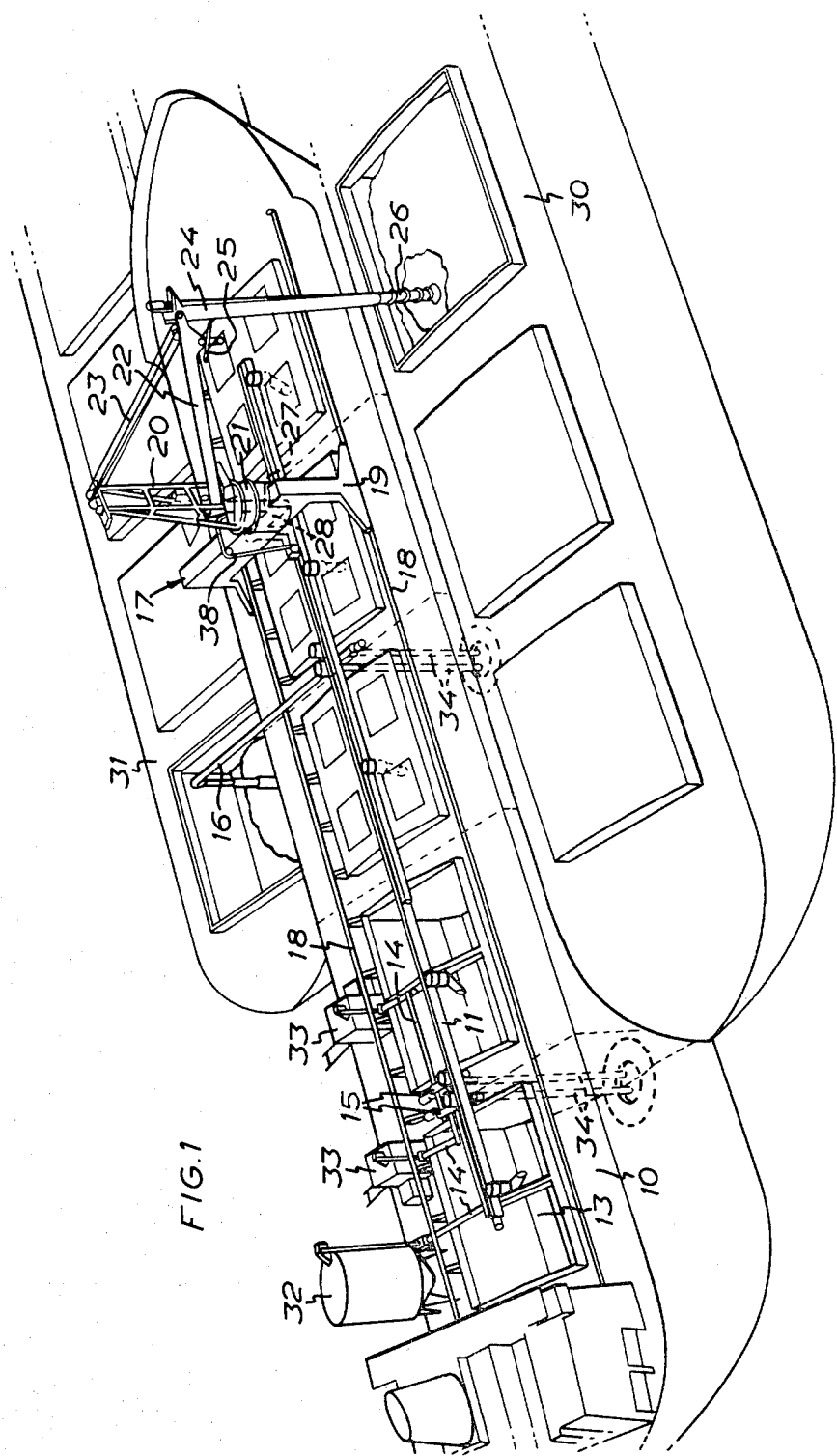
FIG. 1 shows in perspective a vessel utilized for storage purpose and having two conveyors which are interconnected utilizing and apparatus according to the invention.

FIG. 1 shows a vessel 10 which is utilized for the storage of bulk material and is provided with different types of equipment, including an elongate distribution conveyor 11 which extends along the major part of the length of the vessel. This conveyor can supply bulk material to several different positions, for example distributor devices 12 in the different holds 13, or to a number of transfer conveyors 15 or 16. An unloading apparatus 17 is disposed on deck, this unloading apparatus running along rails 18 on the deck of the vessel. The unloading apparatus 17 comprises a gantry frame 19 which carries a tower 20 on a turntable device 21. A horizontal conveyor 22 is pivoted on the tower for being swung vertically with the assistance of a draw works 23. At its outer end, the horizontal conveyor is connected to a vertical conveyor 24, whose angular position with respect to the horizontal conveyor 22 is adjustable by means of a piston and cylinder assembly 25. The two conveyors 22 and 24 are designed as screw conveyors, and, at the lower end of the conveyor 24, there is provided a feeding device 26. The unloading apparatus 17 is suitably designed in accordance with that described in, for example, U.S. Pat. Nos. 3,990,567 and 4,020,953. The horizontal conveyor 22 discharges at a chute or duct 27 centrally disposed in the turntable device 21, the chute or duct in its turn discharging at the inlet end of a further horizontal conveyor 28. The horizontal conveyor 28 discharges in a connecting portion or transition housing 29 which is illustrated in greater detail in FIGS. 2 and 3.

In the example illustrated in FIG. 1, the apparatus located on the vessel 10 is utilized for direct transferring or reloading loose cargo from one barge 30 to another barge 31. The vessel 10 utilized for storage purposes could, however, be berthed at a quay, and, to this end, could be provided with different types of equipment such a intermediate storage containers 32 for loading bulk transport lorries, and bag filling stations 33. These pieces of equipment are connected, by means of schematically intimated conveyors 14, to the transfer conveyors 15, and, via these conveyors, to the conveyor 11 and different unloading equipment 34 in the various holds in the vessel 10.

In order to allow movement of the unloading apparatus 17 along the distribution conveyor 11, the latter has been designed as a screw conveyor in a trough-like casing 35 with upper flared flanges 36. A lid device 37 abuts against these flanges and is in the form of a flexible, elongate web which may consist, for example, of reinforced rubber sheeting and which may have transverse rigidifiers in the form of reinforcement inserts. This web extends in a loop 38 about the travelling gantry 19 of the unloading apparatus.

FIG. 2 shows in greater detail how this loop 38 has been formed. On the gantry 19, there are disposed frame details 39 which, at their lower end in the proximity of the conveyor 11, have a journal 40 on which an arm 41 is mounted. The arm 41 supports, at its free end, a guide roller 42 which is rotatably journaled on the arm 41. The arm is positively urged by means of a compression spring 43 downwardly towards the flanges 36 of the conveyor 11. The spring 43 is placed between an outwardly bent lug 44 (FIG. 5) on the arm 41 and an abutment 45 on the frame detail 39.

The travelling gantry 19 of the unloading apparatus is provided at the top with frame details 46 which support guide rollers 47 rotatably journaled therein. The web 37 extends up over these guide rollers 47 which, thus, hold up the web as the loop 38.

The cross beam of the gantry 19 and the conveyor 28 with its chute 29 are located within the loop 38. Thus, the chute 29 from the conveyor 28 forms a connection between the conveyor 28 and the conveyor 11. The chute 29 terminates at the bottom in a sealing lid 48 which covers the portion of the upper opening, exposed by the loop 38, of the trough-like casing 35 in which the conveyor screw 11 is rotatably journaled. As a result, practically all dust formation on the transfer of dusty bulk cargo between the conveyor 28 and the conveyor 11 is precluded.

Hence, the apparatus according to the invention shown in particular in FIGS. 2 and 3 makes possible the shifting of the conveyor 28 and its chute, connection housing or transition housing 29 to optional positions along the upper opening of the conveyor 11. In this shifting operation, the lid-forming web 37 will progressively be lifted out from, or laid down on, the flanges 36 of the conveyor 11 during the shifting phase. As a result of the spring loading of the guide rollers 42, these will serve as tensioning elements. Should it prove to be necessary, separate tensioning elements may be provided at the ends of the web 37.

In order that the web 37 remain in place over the conveyor 11, it may be retained against the flanges 36 by means of retention catches 49 which, by means of a torsion bar 50, are spring-loaded clock-wise with respect to FIG. 4. As is apparent from this Figure, the catches 49 will, thus, press the web 37 into abutment against the flanges 36 on the trough-like housing 35 of the conveyor 11. The catches 49 are journaled on bearing lugs 51 on the trough-like housing 35.

In order to make possible a rational shifting of the conveyor 28 during successive movements of the location of the loop 38 along the conveyor 11, the frame details 39 on the gantry 19 have been provided with a cam means 52 which is fixedly mounted on a projection 53 from the frame 39. FIGS. 5 and 6 show only one half of the apparatus, but the other half is in mirror-symmetrical relationship to the illustrated half.

As will be apparent from FIGS. 4–6, the guide rail 52 will, on movement of the conveyor 28 in the direction of the arrow P (FIG. 5), successively swing the catches 49 from the position shown by means of solid lines in FIGS. 4 and 5 to the position (49') shown by means of broken lines, the web 37 being released just before the guide roller 42. When the conveyor 28 with its transition housing 29 has been shifted beyond the two illustrated catches 49, 49', these will successively be swung back to the position shown by means of solid lines in FIG. 4 so that they once again clamp the web 37 when this is moved back down towards the flange 36.

As is apparent from FIGS. 3 and 4, the web 37 is provided with longitudinal flanges 54 on its side edges. These flanges serve as drippers and contribute, therefore, to preventing the penetration of water between the flanges 36 and the web 37.

Figure 10:
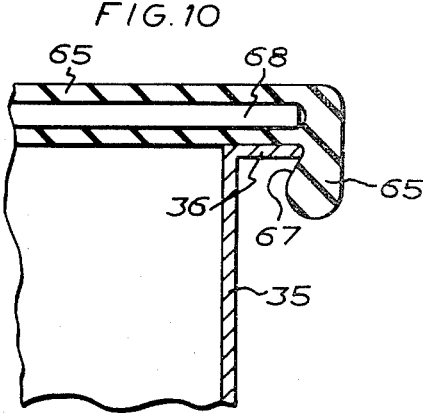
FIG. 10 shows one detail on a larger scale.

FIG. 10 shows an alternative to the locking device in FIG. 4. In this case, the web 65 is provided with flanges 66 at each longitudinal side edge, these flanges having been designed so as to engage, with an engagement surface 67, in behind the flared flange 36 on the trough-like housing 35 of the conveyor. The web 65 will, hereby be snapped in place on the housing 35. Release and retention may be effected in accordance with the same principle utilized for the catches 49, that is to say by means guide rails (not shown). This Figure also shows transverse rigidifying rods 68 which are disposed at interals along, and, during the vulcanization process, secured in the web 65.

The skilled reader of the above description will readily appreciate that the apparatus according to the present invention offers great advantages in that the unloading apparatus 17 may be placed at optional positions along the conveyor 11 without the need to execute any manual operations in conjunction with the movement of the location of the transfer of goods from the one conveyor to the other. As a result, extensive sealing properties of the conveyor 11 are ensured.

Figure 7:
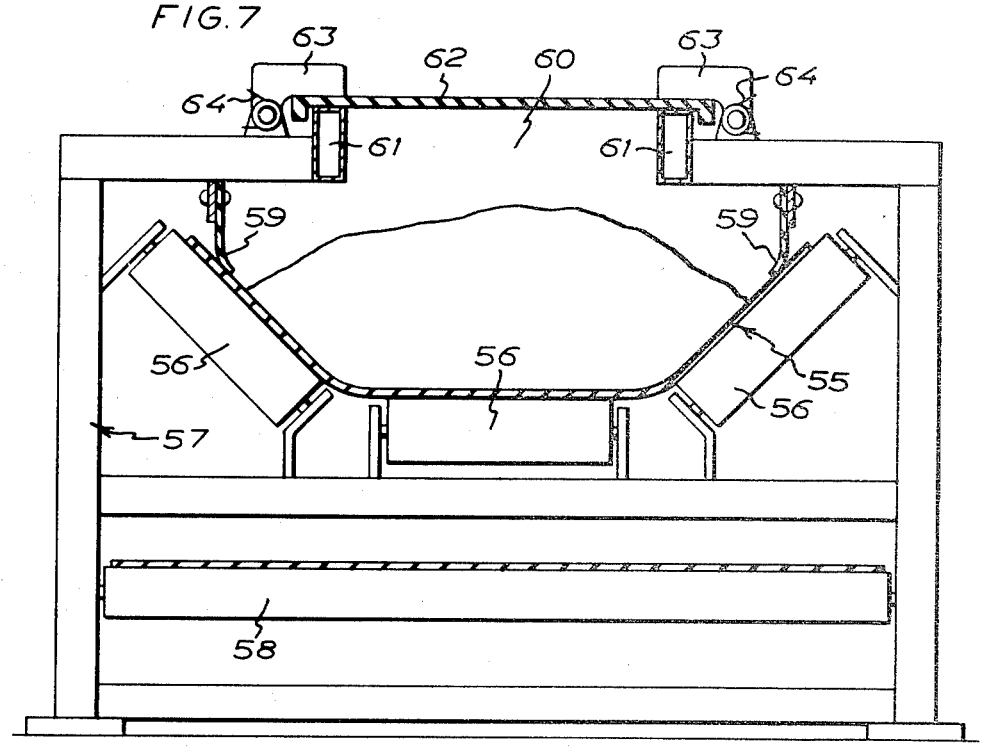
FIG. 7 is a cross-section through another type of conveyor which has an upper elongate opening and which is closed by means of an elongate web.

As is apparent from FIG. 7 the apparatus according to the invention may also be used in other types of receiving conveyors. The conveyor 11 in the embodiment according to FIGS. 1-6 has, in FIG. 7, been replaced by a conveyor belt 55 of usual design, the upper run of the conveyor passing over support and carrier rollers 56 in a frame 57, and the lower run of the conveyor passing on carrier rollers 58 in the frame 57. In the illustrated embodiment, sealings 59 are provided which extend along the upper run of the conveyor belt and abut in dust-tight relationship against the outer edge portions of the conveyor belt. These sealings 59 are also fixedly mounted on the frame 57. At the top, the frame 57 has an elongate opening 60 defined by coamings 61. A web 62 extends between the opposing coamings. This web corresponds to the web 37 in the embodiment according to FIGS. 1-6. Like the web 37, the web 62 is retained against its substrate (the coamings 61) by means of retention catches 63 which are pivotally retained on the frame 57 and are biased by means of springs 64 such that they urge the web 62 against the coaming 61. FIG. 7 does not show how the web 62 is moved out in a loop about a conveyor which is shiftable along the opening 60. However, this arrangement may be fashioned in the same manner as in FIGS. 1-6.

FIGS. 8 and 9 show an embodiment in which the bulk material supply conveyor is stationary and the bulk material removal conveyor is shiftable along the stationary bulk material conveyor.

Thus, FIGS. 8 and 9 show a conveyor 70 which is in the form of a screw conveyor whose casing 71 has, at its bottom, an opening 72 surrounded by a groove-forming housing section 73 with flared flanges 74. A flexible elongate web 75 is fixedly retained by clamp means (not shown, but designed, for example, in accordance with the clamp means in the embodiments according to FIGS. 1-6 and 7, respectively) against the underside of the flanges 74. The web extends in a loop 76 down and around a feeder funnel 77 to a receiving removal conveyor 78 which extends transversely of the conveyor 70. The feeder funnel 77 has upper edge portions 79 which abut the underside of the flanges 74. Guide rollers 80 are provided on the outside of the loop 76 and are rotatably journaled on a double-armed lever 81. The lever 81 is, by the intermediary of a journal 82, pivoted on a frame detail 83 which is fixedly united to the feeder funnel 77 and the housing of the conveyor 78. The other arm of the double-armed lever 81 is connected by means of a tension spring 84 to a spring anchorage 85 on the frame detail 83. As a result of this arrangement, the guide roller 80 will urge the web 75 sealingly against the transition between the flange 74 and the edge portion 79 on the feeder funnel 77. The outside of this edge portion is arched in correspondence with the web 75 running over the guide roller 80.

Moreover, lower guide rollers 86 are provided on the frame detail 83, these guide rollers holding the loop 76 around the feeder funnel 77.

Thus, the embodiment according to FIGS. 8 and 9 also makes for complete freedom of choice in the location of the receiving conveyor 78 along the longitudinal direction of the supply conveyor 70 without the need for executing any manual operations for successive shifting of the opening for the transfer of goods from one conveyor to the other.

The invention has been shown and described in conjunction with special types of conveyors, but may be used in general where it is desired to be able to shift a component along an elongate opening in another component while retaining sealing relationship between the components. Moreover, the invention can be used in conjunction with shiftable re-loading stations between two conveyor belts, the re-loading housing itself (which is shiftable) being placed within the lifted-out loop which consists of the flexible elongate web of the lid divide.

What I claim and desire to secure by Letters Patent is:

1. An apparatus for sealing a connection between a first conveyor and a second conveyor which has a housing with an elongate opening, one of said conveyors being movable relative to the other conveyor in the longitudinal direction of the elongate opening, said first conveyor including a connecting portion which communicates with said second conveyor, a lid device which seals the opening and is formed of a web of flexible material extending in the direction of the elongate opening, said web including a loop which extends around said connecting portion of the first conveyor, guide means connected to and movable with the first conveyor for successively lifting the web away from and laying the web down over the elongate opening in response to relative movement between the conveyors in the longitudinal direction of the elongate opening.

2. The apparatus as recited in claim 1 wherein said guide means comprises a guide roller over which the web extends in forming said loop.

3. The apparatus as recited in claim 2 having means for resiliently urging the guide roller in a direction toward the elongate opening.

4. The apparatus as recited in claim 1, wherein the connecting portion is provided with sealing edges which are disposed to seal against the web at the commencement of said loop.

5. The apparatus as recited in claim 4, wherein said guide means comprises a guide roller over which the web extends in forming said loop.

6. The apparatus as recited in claim 5, having means for resiliently urging the guide roller in a direction toward the elongate opening.

7. The apparatus as recited in any one of claims 1-6, wherein the web overlies edge portions on the opposite sides of the elongate opening, and wherein releasable anchorage members are provided for releasable anchorage of the web against these edge portions.

8. The apparatus as recited in claim 7 wherein the releasable anchorage members comprise clamps which are pivotally mounted on the second conveyor and are resiliently biased to urge the web against said edge portions.

9. The apparatus as recited in any one of claims 1-6, for sealing between two crossing conveyors for bulk material, wherein the first conveyor is a bulk material supply conveyor disposed above the second conveyor which is a bulk material removal conveyor, said connecting portion being a transfer housing, the elongate opening being disposed along the upper side of the bulk material removal conveyor.

10. The apparatus as recited in any one of claims 1-6 for sealing between two crossing conveyors for bulk material, wherein the first conveyor is a bulk material supply conveyor disposed above the second conveyor which is a bulk material removal conveyor, the elongate opening being provided at the bottom in the bulk material supply conveyor whose bottom is at least partly formed by the web sealing the opening, and wherein the bulk material removal conveyor has its connecting portion designed as a feeder funnel.

11. The apparatus as recited in claim 10, wherein the guide means for the web comprises an upper edge portion of the outside of the feeder funnel and a guide roller resiliently urged in a direction towards this edge portion and over which the web extends out in said loop.

* * * * *